No. 790,324. PATENTED MAY 23, 1905.
R. STANLEY.
MANUFACTURE OF EARTHENWARE SANITARY PIPES.
APPLICATION FILED DEC. 6, 1902.

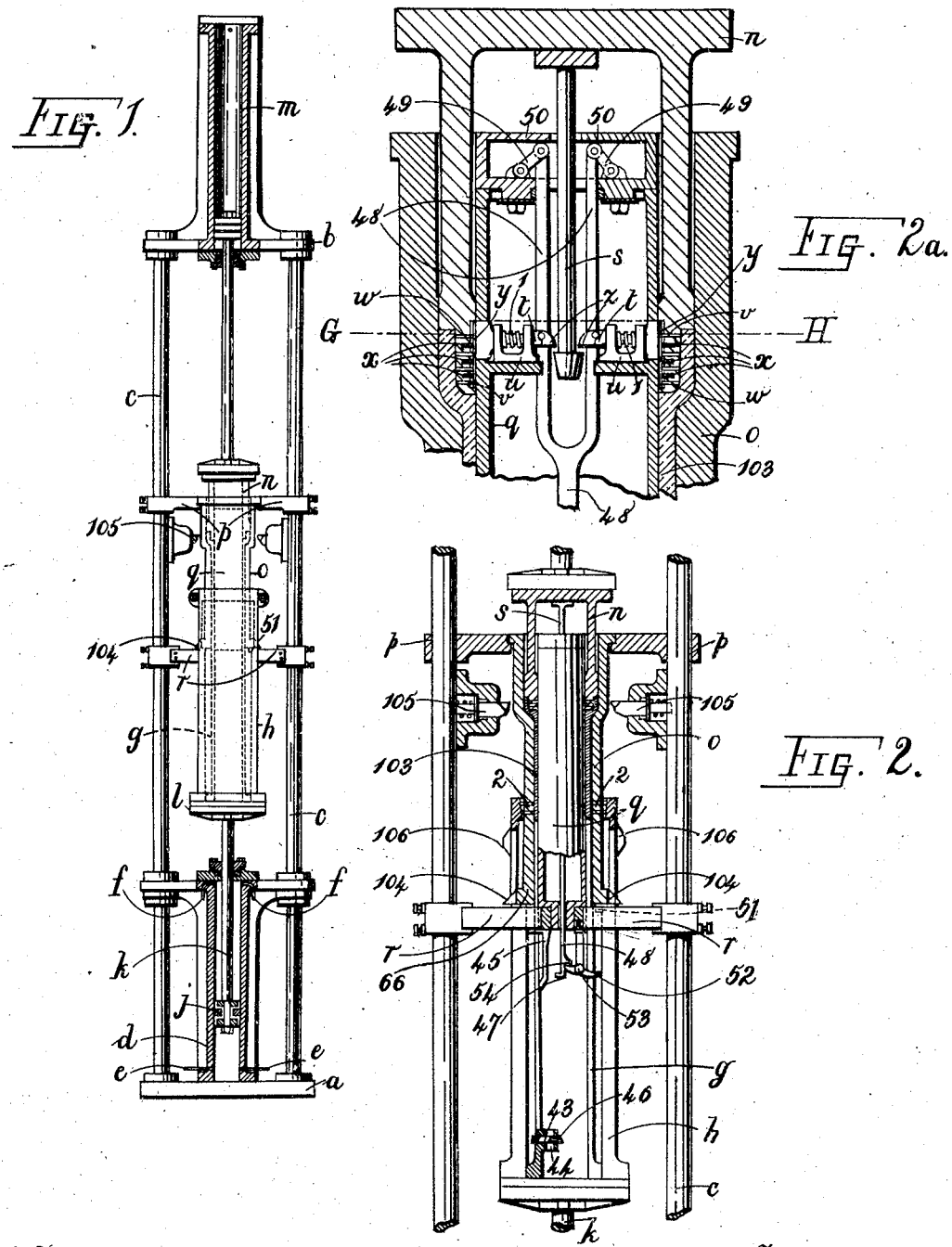

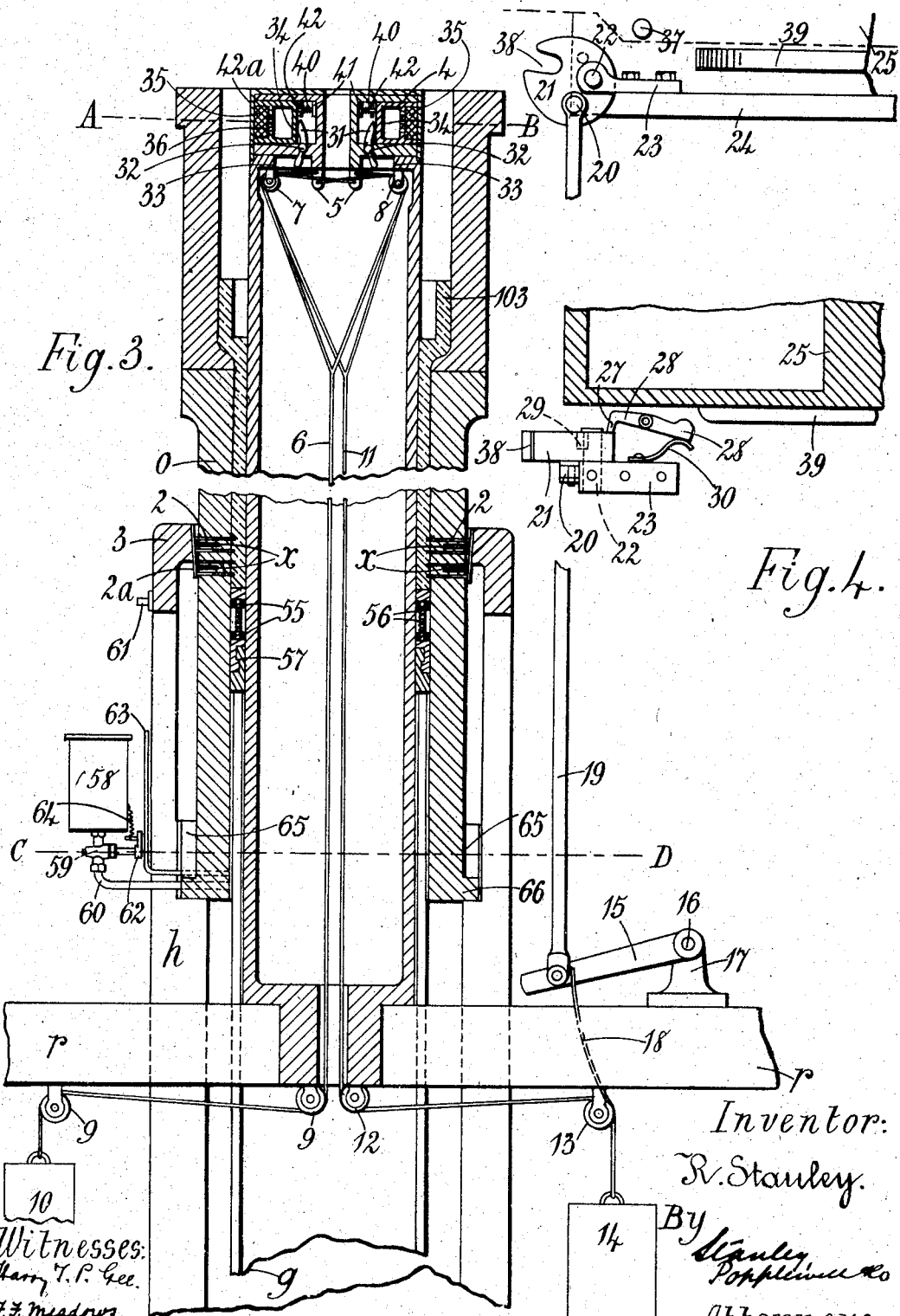

4 SHEETS—SHEET 3.

Witnesses:
Harry J. P. Gee.
F. F. Meadows.

Inventor:
R. Stanley.
By Stanley Popplewell
Attorneys.

No. 790,324. PATENTED MAY 23, 1905.
R. STANLEY.
MANUFACTURE OF EARTHENWARE SANITARY PIPES.
APPLICATION FILED DEC. 6, 1902.
4 SHEETS—SHEET 4.
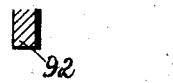
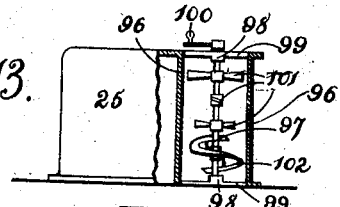
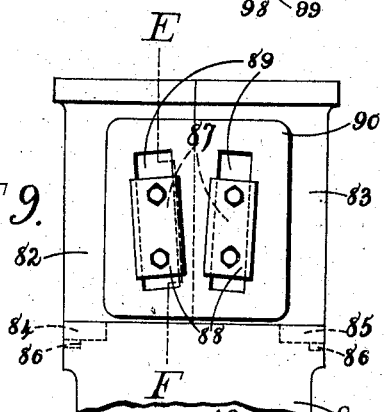
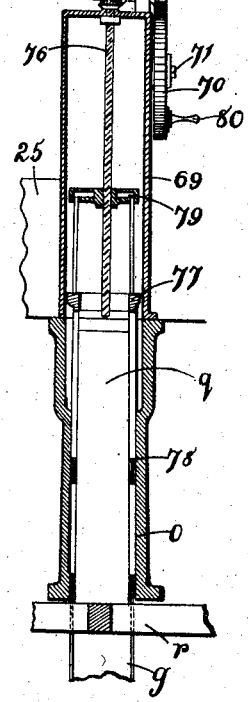
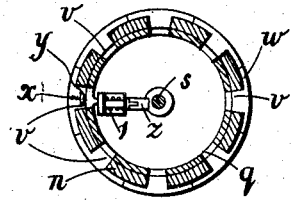
Witnesses.
A. L. Annison
Frank F. Meadows
Inventor.
R. Stanley.
By Stanley Papplewith
Attorneys.

No. 790,324.

Patented May 23, 1905.

UNITED STATES PATENT OFFICE.

REGINALD STANLEY, OF NUNEATON, ENGLAND.

MANUFACTURE OF EARTHENWARE SANITARY PIPES.

SPECIFICATION forming part of Letters Patent No. 790,324, dated May 23, 1905.

Application filed December 6, 1902. Serial No. 134,102.

*To all whom it may concern:*

Be it known that I, REGINALD STANLEY, a subject of Edward, King of Great Britain and Ireland, residing at Manor Court, Nuneaton, in the county of Warwick, England, have invented certain new and useful Improvements in the Manufacture of Earthenware Sanitary Pipes, Cable-Conduits, Ridge-Tiles, Roofing-Tiles, and other Like Objects, of which the following is a specification.

The usual method of manufacturing earthenware pipes and conduits as at present practiced is to take clay well pugged into an even plastic condition and mold it into the desired shape by means of an extrusion-press.

The present invention consists chiefly of improvements in the manufacture of pipes or conduits from semidry clay-dust or other material whereby they are subjected to very considerable end pressure. It relates also to the manufacture of tiles and other like objects, as more fully referred to hereinafter. The proportion of moisture required within the clay is very small, varying a little according to the character or quality of the clay; but the clay is in an essentially powdered condition, care being exercised to prevent any excess of moisture, on the one hand, or insufficiency of moisture, on the other, when it is supplied to the mold.

In order that my invention may be clearly understood, reference is to be had to the accompanying drawings, which are to be taken as part of this specification and read therewith.

Figure 3A:
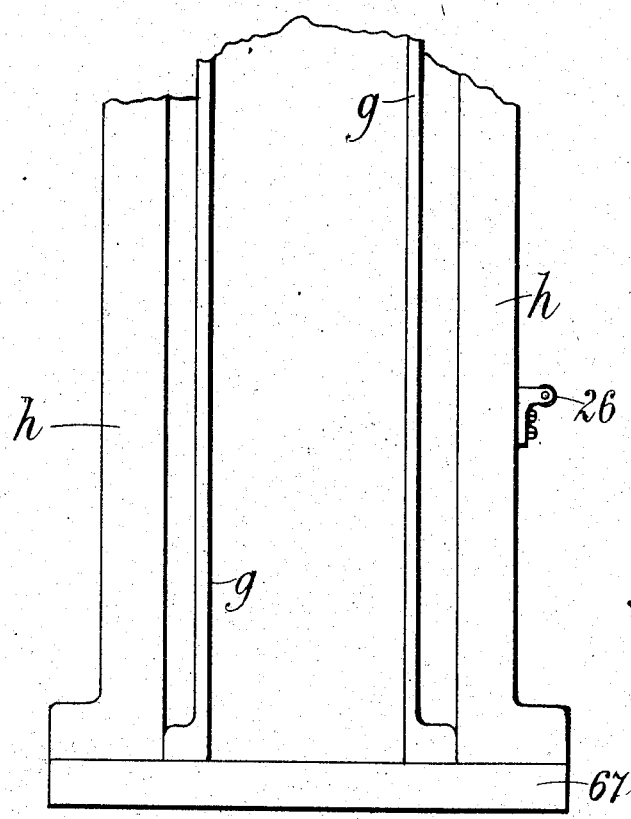
Figure 6:
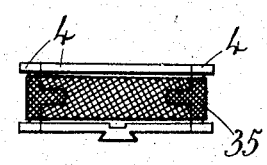
Figure 7:
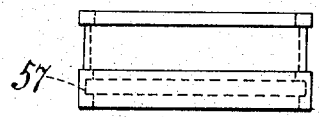
Figure 8:
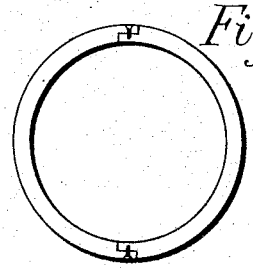
Figure 5:
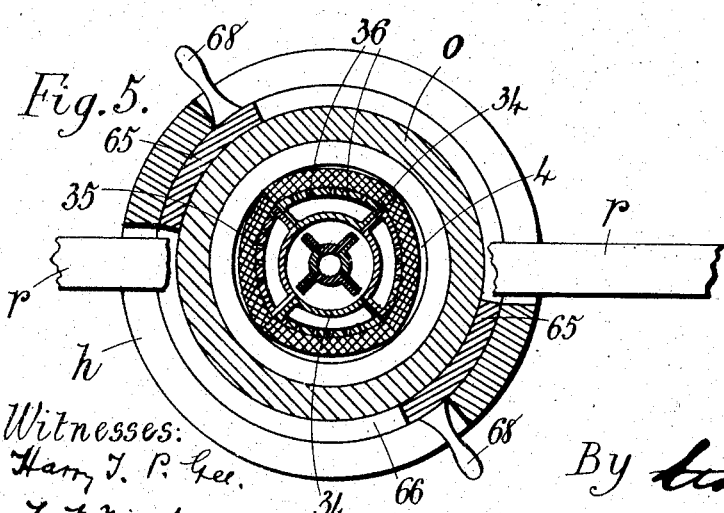

Figure 1 is a sectional elevation, on a reduced scale, of one form of the machine, the hydraulic cylinders alone being in section. Fig. 2 is a vertical section of the middle portion of the same machine. Fig. 2ª is a vertical section, on an enlarged scale, of part of the upper portion of Fig. 2. Fig. 3 is a vertical section of the molds and elevation of part of a feed-box, showing the lubricating arrangement and the butt-end-grooving device. Fig. 3ª is a continuation of the lower part of Fig. 3. Fig. 4 is a plan of some details on the extreme right of Fig. 3. Fig. 5 is a horizontal section through lines A B and C D of Fig. 3. Fig. 6 is a side elevation of the expansible head, carrying lubricating-pads, shown surmounting the core in Fig. 3. Fig. 7 is a side elevation of the barrel-lubricating ring, shown surmounting the lower plunger in Fig. 3. Fig. 8 is a plan of Fig. 7. Fig. 9 is a side elevation of the divided socket-mold, showing same closed. Fig. 10 is a section on line E F of Fig. 9. Fig. 11 is an incomplete section on line G H of Figs. 2ª and 10. Fig. 12 shows an arrangement for lubricating both core and shell at one operation. Fig. 13 shows a sectional elevation of apparatus for the purpose of assisting and forcing the feed material into the mold.

Similar reference letters and figures refer to similar parts throughout the drawings.

The general construction of the first type of machine is shown in Fig. 1, wherein $a$ is the base-blate, $b$ the head-piece, and $c$ the supporting-standards. $d$ is an ordinary hydraulic cylinder having inlet-pipes $e$ and outlet-pipes $f$. Its purpose is to actuate the lower plunger $g$ and lifting-standard $h$ through the medium of piston $j$, piston-rod $k$, and head $l$. $m$ is a similar hydraulic cylinder for actuating the upper plunger $n$. $o$ is the die-shell, hanging normally on the supports $p$ and actuated by the lifting-standard $h$. $q$ is the stationary core, supported on cross-pieces $r$ $r$, clearance being provided for the latter in lifting-standard $h$ and lower plunger $g$. (See Figs. 2 and 3.)

The arrangement for grooving the pipe-socket is shown in Figs. 2, 2ª, 10, and 11, wherein $s$ is a wedge-ended rod secured at its upper end to the upper plunger $n$ and adapted to strike the ends of the spring pressing-bolts $t$, Fig. 2ª, (of which there may be a set of, say, eight around rod $s$, although the full number is not shown on the drawings,) which slide within the brackets $u$, fixed to the stationary core $q$. The rod $s$ is adapted to engage the ends of these spring-bolts when it is just finishing its downward stroke, and in so doing it drives said bolts outwardly, which in turn strike the radial portions $v$ of the grooving-segments $w$, thus forcing the latter into the pipe-socket and forming grooves therein. The segments are withdrawn out of action and remain normally so by means of compression-springs $x$, which bear at one end on the bottoms of the recesses in the upper plunger and at the other end on a vertical piece $y$, which connects all the radial portions $v$ of the segments. The inner ends $z$ of the bolts $t$ are hinged, as shown, in order that the lower end of the rod $s$ may pass idly over them during its ascent. 1 1 are compression-springs for returning bolts $t$ so that their outer ends come flush with the face of core $q$.

A device for grooving the pipe butt-end is shown in Figs. 2 and 3. In this case the means for grooving may be similar to those shown in connection with the socket-grooving. 2 2 are the grooving-segments, which normally remain flush with the inside of the shell $o$. 3 is the upper end of lifting-standard $h$, the inner face of which is inclined, as shown, so as to strike the projecting portions of the grooving-segments 2 2 at a predetermined period in its ascent, and thus force them into the butt. Instead of employing compression-springs, such as $x$, to withdraw the segments, as in Figs. 10 and 11, they may be withdrawn by the positive action of the lifting-standard $h$ by making the outer ends, which may be connected by a vertical bar $2^a$ of the grooving-segments 2 2, to slide in dovetail groove in the upper end 3 of said standard.

The means for the lubrication of the upper part of the shell and also the means for forming one form of temporary platform for supporting the pipe are shown in Figs. 3, 5, and 6. 4 4 are four quadrant-shaped open-sided frames sliding in radial grooves in the top of core $q$, each having at its inner end a depending stud 5. To each opposite pair of such studs are connected the ends of a cord 6, which pass over guide-pulleys 7 and 8 and unite a little lower into one cord, which passes over guide-pulleys 9 and bears at its end a weight 10. Also connected to said studs is a similar cord 11, passing over similar guide-pulleys at the rear of pulleys 7 and 8 (not shown on drawings) and united and passed over guide-pulleys 12 and 13 and bearing at its end weight 14, which is heavier than weight 10 and normally keeps the quadrant-frame 4 home and flush with the face of the core $q$. 15 is a lever fulcrumed at 16 to a bracket 17 on the cross-piece $r$, its free end being united to the weight 14 by cord 18 (normally remaining slack, as shown) and also having pivoted thereto a rod 19, hinged at its upper end at 20 to cam 21, which turns on pin 22, projecting sidewise from bracket 23, fixed to the table 24, on which slides the feed-box 25. 26, Fig. $3^a$, is a roller pivoted on lifting-standard $h$ and engages the end of lever 15 in order to lift the rod 19, and thereby turns cam 21 until the hook end 27 of a lever 28, centrally fulcrumed to table 24, enters the hole 29 in said cam, owing to the pressure of the spring 30 on the farther end of lever 28. Thus the weight 14 is raised and is maintained in its raised position, and the cord 11 becomes loose. The weight 10 is now free to act, and in so doing it expands the quadrants 4, and so forms a temporary table for the support of the pipe and automatically expands certain inner quadrants in order to effect the lubrication of the shell $o$, as follows: During the outward travel of the outer quadrants 4 and just before they reach the limit of such travel the lower ends of levers 31 (hinged at 32 to the base of each outer quadrant) strike the core $q$ at points 33, which causes their upper ends to bear against the inner faces of the inner quadrants 34, and so force the latter outwardly along grooves provided within the outer quadrants. Thus the inner quadrants, which bear the lubricating-pads 35, project slightly beyond the outer quadrants. The former are chambered to contain lubricant, which is absorbed by or forced into the pads 35 through perforations 36 in their curved walls. While the rod 19 is in its raised position stud 37, fixed in the side of the feed-box 25, enters the gap 38 in the cam 21 during the advance of the feed-box. The raised surface 39 on the latter now engages the spring-actuated end of lever 28, thus causing the hook end 27 to release cam 21. During the further advance of the feed-box the stud 37 rides along the gap 38, thus permitting the weight 14 to be lowered gently. The latter now acts through cord 11 and withdraws all the quadrants. The return of the oiling-quadrants 34 is insured by the action of the compression-springs 40 40, which bear at one end on the head of a set-screw 41, screwed into the inner face of each inner quadrant, and at the other end against a small bracket 42, fixed to each outer quadrant and through which said set-screw slides. $42^a$ is a cap to keep the quadrants dust-proof.

In Fig. 2 and Fig. $2^a$ is shown another arrangement for forming the temporary platform for the purpose above mentioned. 43 is a bolt capable of sliding crosswise through the eye 44 upon the inner face of lower plunger $g$. 45 is a stationary wedge-piece fixed to cross-piece $r$. Upon the ascent of the lower plunger $g$ the eye-piece 44 passes over the wedge 45, which then engages the projection 46 on the bolt 43, and thus displaces the latter inwardly. When the lower plunger descends, the inner end of bolt 43 lodges on the hooked end 47 of rod 48 and draws it down, thus straightening out the links 49, Fig. $2^a$, which thereupon expand the sections 50 along radial slots in the top of core $q$. (See also Fig. 10.) 51, Fig. 2, is a projection on the inner wall of the lifting-standard $h$, adapted to strike during its descent lever 52, which is fulcrumed at 53, and so raise the inner end of lever 52 in order that it may engage spur 54 on rod 48, and thus return sections 50. (See Fig. $2^a$.)

The means for lubricating the barrel-mold are shown in Figs. 3, 7, and 8. The upper end of the lower plunger $g$ carries a detachable and vertically-divided ring channeled on both faces (see Fig. 3) for the reception of annular lubricating-pads 55. The channels communicate with one another by perforations 56. The lower part of the ring is neck-grooved at 57 in order that it may be clipped onto the lower plunger proper. 58 is a reservoir for oil, (or other lubricant,) having a stop-cock 59, kept normally shut and communicating with the inner face of shell o by pipe 60. When the said channels are opposite the end of pipe 60, (due to the descent of the lower plunger and lifting-standard,) stud 61 engages handle 62 of stop-cock 59 and opens it for the escape of lubricant into the channels. 63 is a pipe for the escape of air during this operation. Upon the disengagement of stud 61 with handle 62 the spring 64 closes the stop-cock. 65 65 are packing-segments (see also Fig. 5) which rest upon flange 66 of the shell o and upon which the lifting-standard h bears when in its lowest working position. As both the latter and the lower plunger are secured to the plate 67 and work together the oiling or lubricating ring on the lower plunger remains normally within the mold. When, however, it is desired to withdraw such ring for any purpose, the segments 65 65 are given a partial rotation by means of handles 68 68, attached thereto, and then dropped through gaps in the flange 66, (or the segments may be removed altogether,) thus allowing the plunger g to descend low enough for the removal, cleaning, or adjustment of the ring. The segments 65 65 may, if desired, be connected together by a thin plate-ring at the top.

Means for lubricating the complete mold at one operation are shown in Fig. 12. 69 is a carrier attached to the feed-box 25. 70 is a spur-wheel pivoted on the carrier at 71 and gearing with pinion 72, working in the bracket 73 and gearing through bevel-wheels 74 and 75 with a coarse-pitched screw 76. 77 and 78 are padded lubricating-rings, and 79 a reservoir for lubricant. These rings and the reservoir may be connected to one another by tubes, through which the lubricant flows from the reservoir, and so keeps the rings moist. The upper ring lubricates the socket-mold, and the lower ring lubricates the barrel-mold and the outer face of the core q. 80 is a handle for rotating wheel 70 in order to raise and lower the lubricating device through the medium of the gearing described. In conjunction with this device I may still employ the lubricating-ring on the top of the lower plunger, if desired.

The divided socket-mold is illustrated in Figs. 3, 9, and 10. It may not always be necessary to use this form; but I have devised it in order to overcome the adhesion of the clay to the mold at the socket portion, due in a large measure to the tendency to create a vacuum at that portion unless air be admitted by some special means during separation. I may also provide an air-admission valve (or more than one) in the shoulder of the socket mold or shell should such be desired. The inner end of such valve might bear a stamp for impressing characters upon the clay. The socket-shell is divided into two parts 82 83, which slide in dovetailed grooves 84 85 in the top edge of the shell o. 86 86 are stop-studs for limiting the horizontal travel of the two parts of the mold. 87 87 are lugs formed on or attached to each mold part or shell part 82 83. 88 represents guide-plates secured to said lugs for the purpose of retaining them in position within sloping recesses 89 89, formed in a double-acting wedge-plate 90. 91 91 are stop-blocks fixed to the machine and engage plate 90 just as the shell is finishing its descent. (See Fig. 10.) The descent of plate 90 has now been arrested. The lugs 87 slide down the recesses 89 89 during the remainder of the travel of the shell, and so cause the shell parts to approach one another, and thus close the mold. The opening of the shell is effected during its ascent as follows: Just prior to the finish of such ascent the top edges of plates 90 engage stops 92, (which are higher in practice than shown in the drawings,) and so cause lugs 87 87 to travel up said recesses during the remainder of the ascent and open the mold.

A feed apparatus is shown in Fig. 13, according to which the feed-box 25 carries a receptacle 96 on its front end having a vertical spindle 97 mounted in bearings 98 within bars 99 at top and bottom and provided with a handle 100. Splayed plates 101 are fixed to the spindle 97 and also a worm 102. When the feed-box has advanced so as to bring the receptacle 96 over the mold, its contents fall into same, the material being forced out of the receptacle by the combined action of the splayed plates and the worm when the spindle 97 is rotated in the proper direction.

The operation of the machine above described is as follows: (For convenience of description I will assume the parts of the machine to be in their inoperative position.) I first lubricate the mold. This is effected jointly by the oiling-ring of the lower plunger and by the expansible oiling-quadrants which surmount the core, the former lubricating the outside of the core and the lower barrel part of the shell and the latter lubricating the socket-shell and the upper part of the barrel-shell as follows: The lifting-standard and lower plunger being in their lowest positions, the pads 55 55 are consequently opposite the pipe 60, and so become charged with lubricant from reservoir 58, the cock 59 of which has been opened and kept so by stud 61. (See Fig. 3.) The lifting-standard h and lower plunger g are now raised together, the cock 59 is closed by reason of the disengagement of stud 59 with handle 62, and thus the supply of lubricant to the pads 55 55 is cut off. The ascent is continued until the shoulder 51 inside the standard $h$ butts against flange 66 of shell $o$. The lower plunger, lifting-standard, and shell now rise together, and the roller upon the outside of standard $h$ engages lever 15, raising it sufficiently to lift weight 14 by cord 18 in order that the end 27 of lever 28 may enter recess 29 and retain weight 14 in its raised position, allowing stud 37 to enter gap 38 when the feed-box 25 advances. The upward motion now ceases. Weight 10 being now free of the influence of weight 14 descends and in so doing expands the head on the top of core $q$ immediately above the lubricating-pads on the top of the lower plunger and commences the lubrication of the barrel portion of the shell which has not been reached by the lower oiling-ring. The lifting-standard, lower plunger, and shell now descend together, the lip on the top edge of the shell eventually resting upon and being suspended by the crosspieces $p$ $p$ and the lip inside the top of the lifting-standard $h$ eventually resting upon and being suspended by the packing-segments 65 65 on flange 66 of the shell $o$. During the descent the expanded head, which is stationary, lubricates the remaining inner surface of the shell and expands still further when the socket portion of the shell reaches it in order to lubricate its inner surface, the weight 10 during such further expansion descending still lower. During the further advance of the feed-box (which is charged with feed material to be molded) the strip 39 bears on the near end of the lever 28 and releases it from the cam 21; but the cam does not immediately turn, and so allow weight 14 to drop suddenly, because stud 37 is within the gap 38 of the cam. Hence the weight 14 is lowered gently as the feed-box advances. Before the latter has begun to discharge its contents into the mold the cam has become released from the stud 37 and the head has been contracted through the action of weight 14, which, being heavier than weight 10, overcomes the latter. The cap $42^a$ is then placed over the contracted head to protect it from the feed material, and the feed-box is further advanced until its contents are discharged into the mold. It is then withdrawn and the upper and lower plungers caused to approach one another in order to press the pipe. When they have reached the relative positions shown in Figs. 2 and $2^a$, the pipe 103 has been compressed. The butt-end of the pipe has now been grooved by the segments having been forced into the same by the inner inclined surface of the lip on the lifting-standard, and the inner face of the socket has also been grooved by the segments having been forced into the same through the medium of the wedge-ended rod $s$ and spring-bolts $t$. The socket-grooving segments having automatically withdrawn themselves, the upper plunger is now lifted, and the lifting-standard, lower plunger, and shell rise together, carrying with them the pipe. The wedge projections 104 104 on flange 66 (see Figs. 1 and 2) engage the spring-controlled bolts 105 105, forcing them back until the wedge projections have passed them, when they spring out again underneath the flange 66, and thus support the shell $o$. The ascent now ceases. The inner face of the pipe has during such ascent been polished against the outer face of the stationary core $q$. The lifting-standard and lower plunger now commence to descend together, leaving the shell $o$ standing on the bolts 105 105, with the pipe clinging to it. When the top of the lower plunger is just below the dust-cap $42^a$, the latter is removed, and the head on the core expands under the pipe to form the temporary table for the support of the pipe and also for the purpose of lubricating the upper portion of the shell ready for the next pressing. The butt-grooving segments have been automatically withdrawn by the disengagement therefrom of the upper end of the lifting-standard at the commencement of such descent, and a little later the inclined surfaces 106 106 on each side of the slot in the lifting-standard force back the bolts 105 105, which thereby release the shell $o$. Such inclined surfaces operate both sides of the wedge-bolts 105 105, thus leaving a path for the wedge projection 104. The latter drops a little of itself and comes to rest when the butt-end of the pipe rests upon the platform. The friction between the pipe and the shell supports the latter until it is drawn down away from the pipe by the lip on the lifting-standard bearing upon the segments 65 65 in its descent. Thus the outer surface of the pipe is polished. The completed pipe is removed from the machine before the contraction of the head, which occurs soon after wheel 26 becomes disengaged from lever 15. One cycle of operations has now been completed.

Although the alternative method of expanding the head surmounting the core shown in Fig. $2^a$, the divided socket shown in Figs. 3, 9, and 10, the lubricating device shown in Fig. 12, and the feed auxiliaries shown in Fig. 13 have not been described in operation with reference to the machine as a whole, their operations will be easily understood from what has already been said.

As compared with plastic molded pipes the articles turned out by the present invention are greatly superior. Being already hard and firm when they leave the press, they will not be liable to injury in removal or handling. They will not require any hand treatment—such as fettling, turning on a wheel, or grooving by hand, or cutting off—upon removal from the machine. Being already practically dry, they need not go to a drying-shed, but may be taken directly to the kiln. In burning they will keep their shape more perfectly than plastic clay pipes. Being pressed *in situ* within the mold itself, (instead of being extruded, as under the old method,) their appearance is straight and smooth and there are no air-holes. They are much stronger at the arrises and throughout than any plastic pipe can possibly be.

Groups of small pipes may be made at the one operation. For the manufacture of multiple-way conduits the apparatus and process herein described is also applicable, there being obviously a suitable number of molds and cores instead of one single core and also the various modifications essential to the working, the nature of this part of the invention, however, being precisely the same as hereinafter described in connection with a single pipe. My invention is also applicable to the manufacture of flat or irregular-shaped articles, (made in cement or other materials,) such as ridge-tiles and gutters and even thin tiles, the important point being to press the article endwise in a mold, then to lift or lower it in conjunction with a portion of the mold and leaving the article detached on a platform or the lower plunger or the like by lowering or raising or withdrawing the part of the mold moved with it.

The application of the machine for the manufacture of ridge-tiles, &c., will be easily understood. Whether the article be flat or angular or curved or of irregular section, the principle of having a mold the parts of which are moving relatively to one another and between and by which the faces of the article are molded and polished will hold.

If desired, that part of the machine herein termed the "shell" may be stationary, while that part of the machine herein termed the "core" may be movable, or after the article has been pressed it may remain stationary while the core and shell are drawn away from it, either together or single, in order that the article may have a bright smooth polish imparted to its faces.

Having thus described my invention, what I claim is—

1. In a machine for the manufacture of earthenware sanitary pipes, cable-conduits, ridge-tiles, flat tiles and such like articles, a stationary die member, a movable die member so placed that the space between the two members forms the die-space, means for forming the article within the die-space, means for ejecting the article from the die-space together with the movable member, means for supporting the movable member, means for supporting the article, and means for withdrawing the movable member from the article thereby leaving the latter ready for removal.

2. In a machine of the kind specified an inner member and an outer member about said inner member so placed that the space between the two members forms the die-space, said outer member being movable in the direction of the delivery of the pressed article, plungers adapted to enter the die-space for the purpose of pressing the article, one of said plungers being adapted to remove the article clear of the stationary member, means for raising the movable member, means for supporting the article, and means for withdrawing the movable member from the article thereby leaving the latter ready for removal.

3. In the manufacture of such articles as hereinbefore specified, means for molding or pressing same endwise within the mold between two plungers, and means for raising up one half or part of said mold together with the article leaving the other half behind, and also means for afterward lowering said raised half or part, leaving the article standing upon its support ready for removal.

4. In a machine of the kind specified a mold whose walls comprise a stationary member and a movable member, and means for lubricating the upper part of the movable member consisting of lubricating-pieces normally lying flush with the stationary member so as not to interfere with the feeding and pressing operations and adapted to project from the stationary member and bear against the inner wall of the movable member when there is relative motion between the two members.

5. In a machine of the kind specified, the combination with the mold of grooving-segments, means operative lengthwise of the mold for forcing the segments into the article, and means for withdrawing the segments from the article.

In witness whereof I have hereunto set my hand in the presence of two witnesses.

REGINALD STANLEY.

Witnesses:
 THOMAS MARSTON,
 FREDERICK ATKINSON.